United States Patent
Hirose (10) Patent No.: US 6,315,369 B1
(45) Date of Patent: Nov. 13, 2001

(54) HYDRAULIC BRAKING SYSTEM WHEREIN PUMP MOTOR CONTROL PWM FREQUENCY IS LOWERED BELOW UPPER AUDIBILITY LIMIT UNDER PREDETERMINED BRAKING CONDITIONS

(75) Inventor: Masanori Hirose, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/435,826

(22) Filed: Nov. 8, 1999

(30) Foreign Application Priority Data

Dec. 3, 1998 (JP) .................................................. 10-343773

(51) Int. Cl.⁷ .................................................. B60T 13/20
(52) U.S. Cl. .......................................... 303/10; 303/116.1
(58) Field of Search ..................... 303/11, 116.1, 303/10, 115.4, 115.5

(56) References Cited

U.S. PATENT DOCUMENTS

| | | | |
|---|---|---|---|
| 5,287,051 | * | 2/1994 | Konrad et al. ........................ 318/803 |
| 5,295,737 | | 3/1994 | Epple et al. . |
| 5,487,593 | * | 1/1996 | Potts et al. ............................. 303/11 |
| 5,791,745 | | 8/1998 | Sakakibara . |
| 5,880,574 | * | 3/1999 | Otsuka et al. ........................ 318/811 |
| 6,095,620 | * | 8/2000 | Dillard et al. ......................... 303/11 |

FOREIGN PATENT DOCUMENTS

| | | |
|---|---|---|
| 0 486 819 A1 | 5/1992 | (EP) . |
| 8-340695 | 12/1996 | (JP) . |
| 9-191508 | 7/1997 | (JP) . |
| 9-238402 | 9/1997 | (JP) . |
| WO 95/03963 | 2/1995 | (WO) . |

* cited by examiner

Primary Examiner—Douglas C. Butler
Assistant Examiner—Bradley King
(74) Attorney, Agent, or Firm—Oliff & Berridge PLC (57) ABSTRACT

A hydraulically operated braking system including a hydraulic pump operated by an electric motor, and a motor control device connected to the electric motor and controlling an electric current to be applied to the electric motor, by pulse width modulation, such that a PWM frequency at which the electric current is controlled by the pulse width modulation is set at a relatively high value higher than an upper audibility limit while the braking system is placed in a normal braking operation during which the generation of an operating noise of the braking system is not allowed, and at a relatively low value not higher than the upper audibility limit while the braking system is placed in a noise-tolerable braking operation during which the generation of the operating noise is allowed.

22 Claims, 4 Drawing Sheets

HYDRAULIC BRAKING SYSTEM WHEREIN PUMP MOTOR CONTROL PWM FREQUENCY IS LOWERED BELOW UPPER AUDIBILITY LIMIT UNDER PREDETERMINED BRAKING CONDITIONS

This application is based on Japanese Patent Application No. 10-343773 filed on Dec. 3, 1998, the content of which is incorporated hereinto by reference.

BACKGROUND OF THE INVENTION

1. Field of the Invention

The present invention relates to a hydraulically operated braking system including a hydraulic pump operated by an electric motor.

2. Discussion of the Related Art

One example of a hydraulically operated braking system of the type indicated above is disclosed in Japanese Patent Application No. 10-243036 which was filed by the assignee of the present application and has not been laid open at the time the present invention was made. This braking system includes a wheel brake cylinder operated by a pressurized fluid to brake a vehicle wheel, a hydraulic pump for delivering the pressurized fluid to the wheel brake cylinder, an electric motor for operating the hydraulic pump, and a motor control device for controlling an electric current applied to the electric motor. In this braking system, the fluid pressure in the wheel brake cylinder is controlled by controlling the amount of the electric current applied to the electric motor. The amount of the electric current applied to the electric motor is increased to increase the output of the electric motor, when the required fluid pressure in the wheel brake cylinder or the required rate of increase of the fluid pressure is relatively high, for applying an abrupt brake to the vehicle wheel, for example.

A PWM (pulse width modulation) control is known as a common method of controlling the amount of the electric current to be applied to the electric motor. In the PWM control, a non-contact switching element included in the motor control device is alternately turned ON and OFF at a controlled duty ratio to control the amount of the electric current to be applied to the electric motor. The duty ratio is a ratio of the ON time during which the switching element is held ON, to the cycle time which is a sum of the ON and OFF times. The amount of the electric current applied to the electric motor is increased with an increase in the duty ratio. For minimizing the operating noise of the electric motor, it is generally known that the switching frequency of the switching element (namely, the PWM control frequency) is desirably higher than the upper limit of the audible range, that is, higher than the upper audibility limit. It is also known that the amount of heat generated by the switching operation of the switching element increases with an increase in the duty ratio and an increase in the switching frequency, and that the expected service life of the switching element is prolonged with a decrease in the amount of the generated heat.

SUMMARY OF THE INVENTION

It is therefore an object of the present invention to provide a hydraulically operated braking system which includes a hydraulic pump operated by an electric motor and which has a reduced operating noise and a prolonged service life.

The above object may be achieved according to any one of the following modes of the present invention, each of which is numbered like the appended claims and depends from the other mode or modes, where appropriate, so as to indicate various technical features and possible combination of those features within the principle of the present invention. However, it is to be understood that the present invention is not limited to those features and combinations.

(1) A hydraulically operated braking system including a hydraulic pump operated by an electric motor, characterized by comprising:

a motor control device which controls the electric motor and controls an electric current to be applied to the electric motor, by pulse width modulation, such that a PWM frequency at which the electric current is controlled by the pulse width modulation is set at a relatively high value higher than an upper audibility limit while the braking system is placed in a normal braking operation during which the generation of an operating noise of the braking system is not allowed, and at a relatively low value not higher than the upper audibility limit while the braking system is placed in a noise-tolerable braking operation during which the generation of the operating noise is allowed.

In the hydraulically operated braking system of the present invention constructed as described above, the PWM frequency at which the electric current to be applied to the electric motor for driving the hydraulic pump is made higher than the upper audibility limit (upper limit of the audible range) while the braking system is in the normal braking operation. Accordingly, the generation of the operating noise can be prevented during the normal braking operation. Usually, the operating noise generated by the electric motor is most uncomfortable to the vehicle operator and passengers, in the hydraulic braking system. In this sense, preventing the generation of the operating noise of the electric motor is valuable and significant. While the braking system is placed in the noise-tolerable braking operation, on the other hand, the PWM frequency is lowered below the upper audibility limit, the amount of heat generated by a switching operation to effect the pulse width modulation for controlling the electric current to the electric motor is restricted (2) A hydraulically operated braking system according to the above mode (1), wherein the motor control device includes a switching element which is alternately turned on and off at a controlled switching frequency as the PWM frequency.

The expected service life of the switching element is relatively long when it has a relatively large capacity. However, the switching element having a large capacity is expensive and is not desirable in this respect. Further, the service life of the switching element usually affects that of the motor control device. In this sense, restricting the amount of heat generated by the switching element according to the present invention is effective to prolong the service life of the motor control device.

The present invention was made for the purpose of reducing the operating noise of the electric motor and the service life of the motor control device in the hydraulically operated braking system as disclosed in the Japanese Patent Application No. 10-243036 referred to above. As discussed below, a hydraulic pump is used for various purposes in a hydraulically operated braking system. Such a hydraulic pump is commonly driven by an electric motor. The principle of the present invention is applicable to such a hydraulically operated braking system equipped with a hydraulic pump and an electric motor for operating the hydraulic pump.

The electric motor is generally operated when the braking system is in a braking operation, which is either the normal braking operation described above, or the noise-tolerable braking operation also described above. Usually, whether the braking system is placed in the normal braking operation or the noise-tolerable braking operation is determined by the presence or absence of a command to initiate a braking operation, and by the desired degree or manner of braking. A braking operation is initiated in response to an operation of a brake operating member by the vehicle operator, or automatically irrespective of the operation of the brake operating member. In the former case, the desired degree or manner of braking is determined by the manner in which the brake operating member is operated by the vehicle operator. In the latter case, the braking operation is effected for effecting a traction control of a drive wheel of the vehicle, or for improving the running stability of the vehicle, for example. In this latter case, the desired degree or manner of braking is determined by the specific requirements for the traction control or vehicle stability control.

(3) A hydraulically operated braking system according to the above mode (1) or (2), wherein the motor control device includes an abrupt-braking-operation frequency lowering device which lowers the PWM frequency to the relatively low value when the braking system is placed in an abrupt braking operation as the noise-tolerable braking operation.

When the braking system is in an abrupt braking operation, the vehicle driver and passengers are usually strained and are not so sensitive to the operating noise generated by the electric motor even where the noise level is high. In this respect, it is reasonable to classify the abrupt braking operation as the noise-tolerable braking operation in which the generation of the operating noise is allowed. The electric motor used in the hydraulically operated braking system generally requires a relatively large amount of electric current to be applied thereto, causing a relatively large amount of heat generated by the switching element, and a resulting shortening of the service life of the switching element due to overheating. When an abrupt braking operation is desired by the vehicle operator, the desired output of the electric motor is relatively large, and the required amount of electric current to be applied to the electric motor is relatively large. Therefore, it is valuable to lower the PWM frequency during the abrupt braking operation, for reducing the amount of heat generated by the switching element, and thereby prolonging the service life of the switching element and the motor control device.

(4) A hydraulically operated braking system according to the above mode (3), wherein the abrupt-braking-operation frequency lowering device includes determining means for determining that the braking system is placed in the abrupt braking operation when a desired value of an output of the electric motor is larger than a predetermined threshold.

(5) A hydraulically operated braking system according to the above mode (4), wherein the determining means determines that the braking system is placed in the abrupt braking operation when a desired value of a pressure of a working fluid pressurized by the hydraulic pump is higher than a predetermined threshold.

(6) A hydraulically operated braking system according to the above mode (4) or (5), wherein the determining means determines that the braking system is placed in the abrupt braking operation when a difference between a desired value and an actual value of a pressure of a working fluid pressurized by the hydraulic pump is larger than a predetermined threshold.

(7) A hydraulically operated braking system according to any one of the above modes (4)–(6), wherein the determining means determines that the braking system is placed in the abrupt braking operation when a desired rate of increase of a pressure of a working fluid pressurized by the hydraulic pump is higher than a predetermined threshold.

(8) A hydraulically operated braking system according to the above mode (4), further comprising a wheel brake cylinder to which a working fluid pressurized by the hydraulic pump is supplied to brake a wheel of a vehicle, and wherein the determining means determines that the braking system is placed in the abrupt braking operation when a desired value of a pressure of the working fluid in the wheel brake cylinder is higher than a predetermined threshold.

(9) A hydraulically operated braking system according to the above mode (3), further comprising a wheel brake cylinder to which a working fluid pressurized by the hydraulic pump is supplied to brake a wheel of a vehicle, and wherein the abrupt-braking-operation frequency lowering device includes determining means for determining that the braking system is placed in the abrupt braking operation when a desired value of a pressure of the working fluid in the wheel brake cylinder is higher than a predetermined threshold, and/or when a desired rate of increase of the pressure of the working fluid in the wheel brake cylinder is higher than a predetermined threshold.

(10) A hydraulically operated braking system according to the above mode (9), further comprising a brake operating member, and wherein the determining means determines the desired value of the pressure of the working fluid in the wheel brake cylinder, on the basis of an operating force which acts on the brake operating member.

(11) A hydraulically operated braking system according to the above mode (9) or (10), further comprising a brake operating member, and wherein the determining means determines the rate of increase of the pressure of the working fluid in the wheel brake cylinder, on the basis of a rate of increase of an operating force which acts on the brake operating member.

(12) A hydraulically operated braking system according to the above mode (9) or (10), wherein the determining means determines the rate of increase of the pressure of the working fluid in the wheel brake cylinder, on the basis of a difference between a desired value and an actual value of the pressure of the working fluid in the wheel brake cylinder.

In the braking system according to the above modes (10)–(12), the determining means of the abrupt-braking-operation frequency lowering device may use: a braking force sensor for detecting the operating force acting on the brake operating member; an operating speed sensor for detecting an operating speed of the brake operating member; or a combination of the braking force sensor and a wheel brake cylinder pressure sensor for detecting the actual value of the pressure of the working fluid in the wheel brake cylinder. The operating force which acts on the brake operating member may be detected directly by a load measuring device. However, the operating force may be calculated from the fluid pressure in a master cylinder to which the brake operating member is operatively connected. The operating speed of the brake operating member may be detected by a sensor for detecting a velocity of movement of the brake operating member. However, the operating speed may be calculated from a rate of increase in the operating force acting on the brake operating member. Alternatively, the rate of increase of the operating force may be used as the operating speed of the brake operating member.

(13) A hydraulically operated braking system according to any one of the above modes (1)–(12), wherein the motor control device includes a slip-control-operation frequency lowering device which lowers the PWM frequency to the relatively low value when the braking system is placed in a slip control braking operation as the noise-tolerable braking operation.

(14) A hydraulic operated braking system according to the above mode (13), further comprising a brake operating member and a wheel brake cylinder to which a working fluid pressurized by the hydraulic pump is supplied to brake a wheel of a vehicle, and wherein the slip-control-operation frequency lowering device includes determining means for determining that the braking system is placed the slip control braking operation when the braking system is placed in an anti-lock braking operation in which the pressure of the working fluid supplied from the hydraulic pump to the wheel brake cylinder during an operation of the brake operating member is controlled such that a degree of slipping of the wheel is held within a predetermined range.

(15) A hydraulic operated braking system according to the above mode (13) or (14), further comprising a brake operating member and a wheel brake cylinder to which a working fluid pressurized by the hydraulic pump is supplied to brake a drive wheel of a vehicle, and wherein the slip-control-operation frequency lowering device includes determining means for determining that the braking system is placed in the slip control braking operation when the braking system is placed in a traction control braking operation in which the pressure of the working fluid supplied from the hydraulic pump to the wheel brake cylinder without an operation of the brake operating member is controlled such that a degree of slipping of the drive wheel is held within a predetermined range.

In the braking system according to the above mode (14) or (15), the anti-lock braking operation or the traction control braking operation is classified as the noise-tolerable braking operation in which the PWM frequency is lowered below the upper audibility limit. During the traction control braking operation, the noise generated by a vehicle drive power source (e.g., engine) is usually large. During the anti-lock braking operation, the vehicle operator is usually strained and is not so sensitive to the operating noise of the braking system. Although the load acting on the electric motor and the desired output of the electric motor during the anti-lock braking operation or traction control braking operation are not always large, it is effective to lower the PWM frequency to the level not higher than the upper audibility limit and restrict the amount of heat generated, for prolonging the service life of the motor control device, since it is not required to reduce the operating noise of the electric motor during the anti-lock or traction control braking operation of the braking system.

(16) A hydraulically operated braking system according to any one of the above modes (1)–(12), includes slip-control-operation frequency lowering device for lowering the PWM frequency when the braking system is placed in a slip control braking operation and when a load acting on the electric motor is larger than a predetermined threshold.

(17) A hydraulically operated braking system according to the above mode (16), further comprising a brake operating member and a wheel brake cylinder to which a working fluid pressurized by the hydraulic pump is supplied to brake a wheel of a vehicle, and wherein the slip-control-operation frequency lowering device includes determining means for determining that the braking system is placed in the slip control braking operation when the braking system is placed in an anti-lock braking operation in which the pressure of the working fluid supplied from the hydraulic pump to the wheel brake cylinder during an operation of the brake operating member is controlled such that a degree of slipping of the wheel is held within a predetermined range, the determining means determining that the load acting on the electric motor is larger than the predetermined threshold when the pressure of the working fluid in the wheel brake cylinder is higher than a predetermined threshold.

In the braking system according to the above mode (17), an anti-lock braking operation while the pressure of the fluid in the wheel brake cylinder is lower than the predetermined threshold is classified as the normal braking operation. Further, a traction control braking operation is also classified as the normal braking operation. The present mode of the invention is effective to minimize the operating noise, and restrict the amount of heat generated by the switching element only when a need for restricting the amount of heat generated is considerably high.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
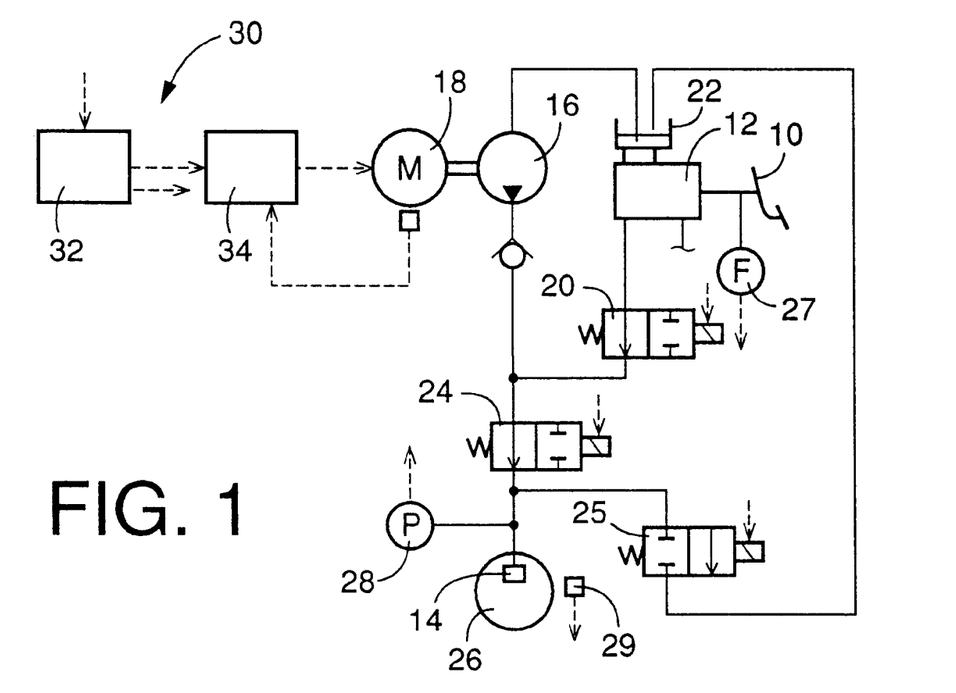
FIG. 1 is a diagram showing a hydraulically operated braking system constructed according to one embodiment of this invention.

Referring first to FIG. 1, the hydraulically operated braking system includes a brake operating member in the form of a brake pedal 10, a master cylinder 12, a wheel brake cylinder 14, a hydraulic pump 16, and an electric motor 18. The master cylinder 12 which is activated by the brake pedal 10 is constructed to pressurize a working fluid to a pressure level corresponding to an operating force which acts on the brake pedal 10. The pressurized fluid is supplied to the wheel brake cylinder 14 under a given condition described below. Between the master cylinder 12 and the wheel brake cylinder 14, there is provided a solenoid-operated shut-off valve 20. When the hydraulic pump 16 and the electric motor 18 are normal, the shut-off valve 20 is held in a closed state in which the wheel brake cylinder 14 is disconnected from the master cylinder 12. In the event of any abnormality associated with the hydraulic pump 16 and/or the electric motor 18, the shut-off valve 20 is brought to an open state in which the fluid pressurized by the master cylinder 12 is supplied to the wheel brake cylinder 14, so that a brake device which is provided for a wheel 26 of an automotive vehicle and which includes the wheel brake cylinder 14 is activated to brake the vehicle wheel. 26.

The hydraulic pump 16 is provided to pressurize a working fluid received from a master reservoir 22, so that the pressurized fluid is supplied to the wheel brake cylinder 14. While the brake pedal 10 and the master cylinder 12 serve as a manually operated hydraulic pressure source, the hydraulic pump 16 cooperates with the electric motor 18 to serve as an electrically operated hydraulic pressure source. In other words, the hydraulic pump 16 is one element of the electrically operated hydraulic pressure source. The pressure and delivery or flow rate of the fluid pressurized by the hydraulic pump 16 are controlled by controlling an electric current to be applied to the electric motor 18, so that the fluid pressure in the wheel brake cylinder 14 is controlled.

A solenoid-operated shut-off valve 24 is provided between the hydraulic pump 16 and the wheel brake cylinder 14, while a solenoid-operated shut-off valve 25 is provided between the wheel brake cylinder 14 and the master reservoir 22. The fluid pressure in the wheel brake cylinder 14 is raised or reduced by controlling the shut-off valves 24, 25 as needed. The present braking system is arranged to be capable of performing an anti-lock control of the fluid pressure in the wheel brake cylinder 14 while the slipping tendency of the vehicle wheel 26 being braked by activation of the wheel brake cylinder 14 is larger than an upper limit determined by the friction coefficient of the road surface on which the wheel 26 lies. In the anti-lock control, the fluid pressure in the wheel brake cylinder 14 is controlled so that the amount of slip of the wheel 26 is held within a predetermined optimum range. The present braking system is further arranged to be capable of performing a traction control of the wheel 26 while the wheel 26 being driven by a drive power source has an excessively large slipping tendency, in substantially the same manner as in the anti-lock control.

A target or desired value of the fluid pressure to be applied to the wheel brake cylinder 14 during a normal braking operation is determined on the basis of an output signal of a brake pedal force sensor 27, which represents an operating force acting on the brake pedal 10. On the other hand, an actual value of the fluid pressure in the wheel brake cylinder 14 is detected by a wheel brake cylinder pressure sensor 28. A rotating speed of the vehicle wheel 26 is detected by a wheel speed sensor 29. The output signal of the wheel speed sensor 29 is used to obtain an estimated running speed of the vehicle, and the slipping condition of the wheel 26.

Figure 2:
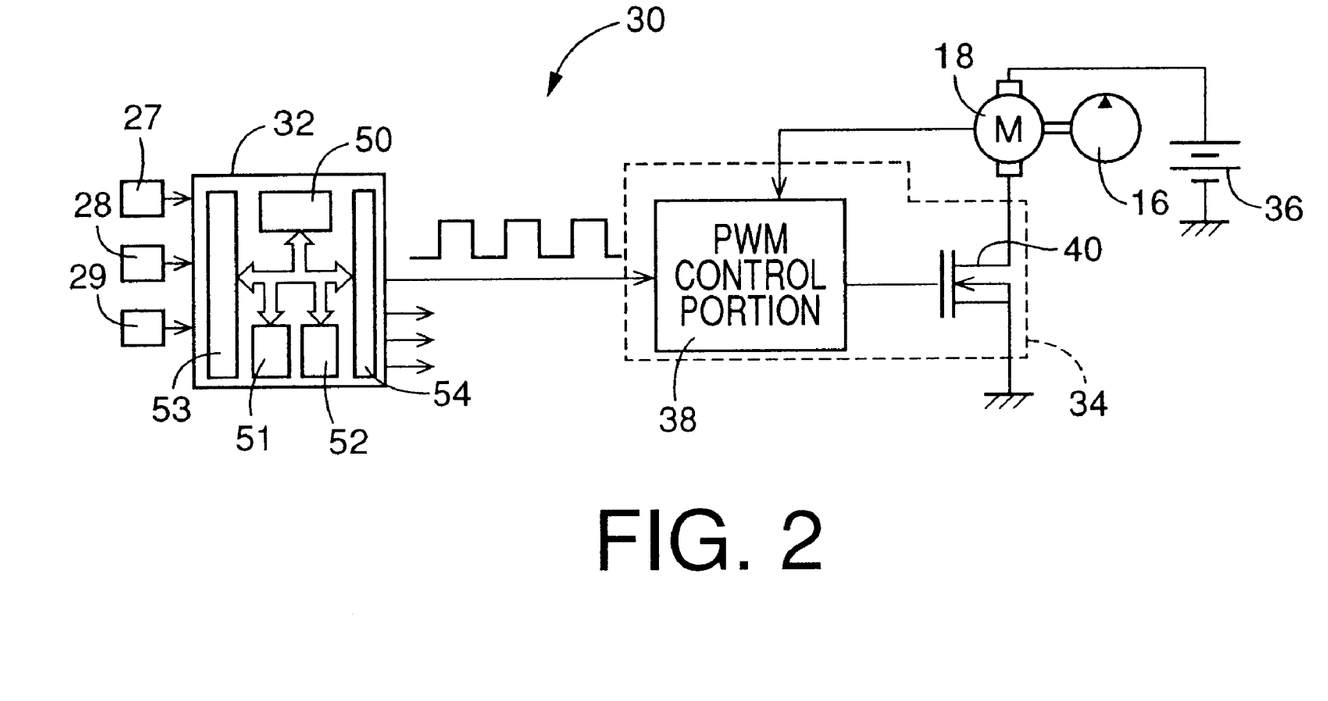
FIG. 2 is a block diagram illustrating a motor control device included in the braking system of FIG. 1.

The electric current to be applied to the electric motor 18 is controlled by a motor control device 30, which includes a controller 32 and an inverter 34, as shown in FIG. 2. The controller 32 is constituted principally by a computer. The electric current is applied from a power source in the form of a battery 36 to the electric motor 18, under the control of the inverter 34, which is controlled by the controller 32. The inverter 34 includes a PWM control portion 38, and a non-contact switching element 40. The switching element 40 is alternately turned ON and OFF by the PWM control portion 38, so that the amount of the electric current to be applied to the electric motor 18 is controlled by a pulse signal. The PWM control portion 38 controls the switching element 40, by pulse width modulation, according to a control command received from the controller 32 and on the basis of the actual amount of the electric current applied to the electric motor 18.

The controller 32 includes a central processing unit (CPU) 50, a read-only memory (ROM) 51, a random-access memory (RAM) 52, an input portion 53 and an output portion 54. To the input portion 53, there are connected the brake pedal force sensor 27, wheel brake cylinder pressure sensor 28 and wheel speed sensor 29, which have been described above. To the output portion 54, there are connected the inverter 34 and the solenoid-operated shut-off valves 20, 24, 25 indicated above. The ROM 51 stores various control programs such as: a motor control program including a PWM control frequency determining program for executing a routine illustrated in the flow chart of FIG. 3; a normal braking control program; an anti-lock control program; and a traction control program. The PWM control frequency determining routine of FIG. 3, which is executed according to the PWM control frequency determining program, is formulated to determine the switching frequency f of the switching element 40 (PWM or pulse width modulation control frequency). The target or desired fluid pressure in the wheel brake cylinder 14 (braking pressure) and the target or desired rate of change of the braking pressure are determined according to the normal braking control program, anti-lock control program or traction control program, and the target or desired output of the electric motor 18 is determined on the basis of the determined target braking pressure and rate of change of the braking pressure, according to the motor control program. Control signals representative of the switching frequency f of the switching element 40 (determined according to the PWM control frequency determining program) and the target output of the electric motor 18 (determined according to the motor control program) are fed to the inverter 34.

The electric current to be applied to the electric motor 18 is controlled by controlling the switching frequency f (PWM control frequency) and the duty ratio of the switching element 40. The duty ratio is a ratio of the ON time during which the switching element 40 is held ON, to the cycle time which is equal to a sum of the ON and OFF times of the switching element 40.

The amount of the electric current to be applied to the electric motor 18 increases with an increase in the duty ratio of the switching element 40. An output Pw of the electric motor 18 increases with an increase in the amount of electric current applied thereto, provided the voltage of the battery 36 is constant. Therefore, the duty ratio is increased when the target value of the output Pw of the electric motor 18 is increased.

The switching operation of the switching element 40 may cause an operating noise of the electric motor 18. To prevent the generation of the operating noise, the switching frequency or PWM control frequency is made higher than the upper limit of the audible range, that is, higher than the upper audibility limit, while the vehicle is placed in a normal running condition, more precisely, while the braking system is in a normal braking operation. On the other hand, the switching operation of the switching element 40 causes heat generation. The amount of the generated heat increases with an increase in the switching frequency and an increase in the duty ratio.

As described above, it is required to increase the duty ratio of the switching element 40 in order to increase the output Pw of the electric motor 18, and it is desirable to set the switching frequency at a value higher than the upper audibility limit. For prolonging the expected service life of the switching element 40, on the other hand, it is desirable to lower the switching frequency. With these findings taken into consideration, the PWM control of the switching element 40 is implemented to determine the switching frequency and the duty ratio, as described below in detail.

While the braking system is in the normal braking operation, the switching or PWM control frequency of the switching element 40 is set at 20 kHz, which is higher than the upper audibility limit, so that the generation of the operating noise of the electric motor 18 is prevented. While the braking system is in a noise-tolerable braking operation, the switching frequency is set at 500 Hz, which is well lower than the upper audibility limit, so that the amount of heat generated by the switching element 40 and its expected service life are reduced and prolonged, respectively. The noise-tolerable braking operation of the braking system is defined as any one of the following braking operations: (1) an abrupt braking operation in which an abrupt brake application to the vehicle wheel 26 is required; (2) an anti-lock braking operation in which the above-indicated anti-lock control is effected while the fluid pressure in the wheel brake cylinder 14 is higher than a predetermined upper limit or threshold; and (3) a traction control braking operation in which the above-indicated traction control is effected.

The abrupt braking operation is detected when at least one of the two following conditions is satisfied: (a) the target fluid pressure in the wheel brake cylinder 14 is higher than a predetermined threshold which is determined depending upon the operating force acting on the brake pedal 10; and (b) a difference between the target and actual fluid pressure values of the wheel brake cylinder 14 is larger than a predetermined threshold. A determination as to whether the anti-lock braking operation is effected or not is made on the basis of an anti-lock control flag which is set and reset according to the anti-lock control program. A determination as to whether the traction control braking operation is effected or not is similarly made on the basis of a traction control flag which is set and reset according to the traction control program.

Figure 3:
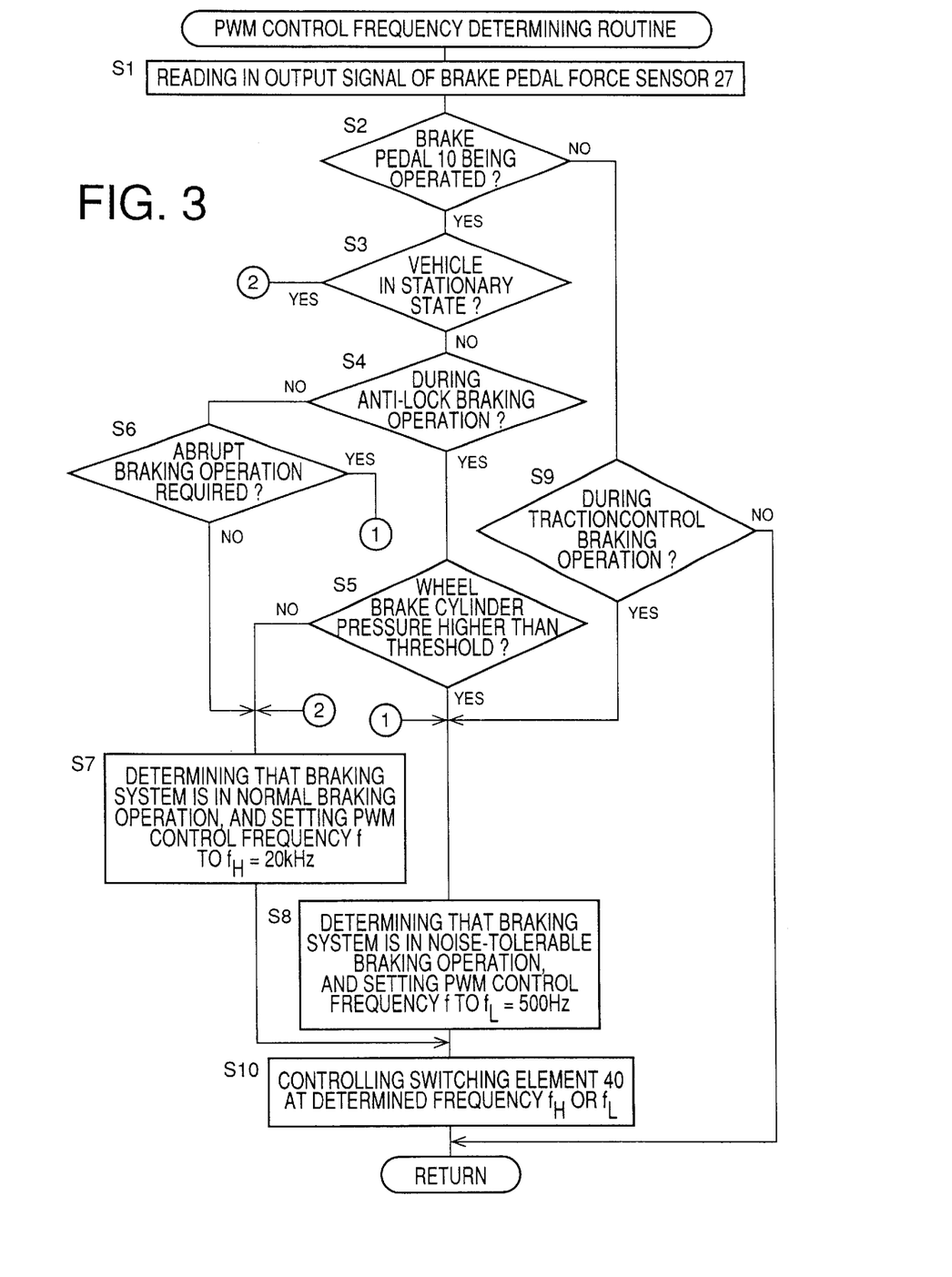
FIG. 3 is a flow chart illustrating a PWM control frequency determining routine executed according to a motor control program stored in a ROM of the motor control device of FIG. 2.

The PWM control frequency determining routine executed by the controller 32 is illustrated in the flow chart of FIG. 3. This routine is initiated with step S1 to read in the output signal of the brake pedal force sensor 27, which represents the operating force acting on the brake pedal 10. Step S1 is followed by step S2 to determine whether the brake pedal 10 has been operated, that is, whether the braking system is in a braking operation. This determination in step S2 is based on the detected operating force of the brake pedal 10 as represented by the output signal of the force sensor 27. More specifically described, the braking system is determined to be in a braking operation when the detected operating force is larger than zero. If an affirmative decision (YES) is obtained in step S2, the control flow goes to step S3–S6 to determine whether the braking system is in the noise-tolerable braking operation. Step S3 is provided to determine whether the vehicle is stationary, by determining whether the estimated vehicle running speed is lower than a predetermined limit, below which the vehicle is considered to be in a stationary state. When a negative decision (NO) is obtained in step S3, the control flow goes to step S4 to determine whether the anti-lock braking operation is effected. If an affirmative decision (YES) is obtained in step S4, the control flow goes to step S5 to determine whether the fluid pressure in the wheel brake cylinder 14 is higher than a predetermined threshold. If a negative decision (NO) is obtained in step S4, the control flow goes to step S6 to determine whether the abrupt braking operation is effected.

When an affirmative decision (YES) is obtained in step S3, that is, when the braking system is in a braking operation while the vehicle is stationary, the control flow goes to step S7 to determine that the braking system is in the normal braking operation, and set the PWM control frequency or switching frequency f of the switching element 40 to 20 kHz, to prevent the generation of an operating noise of the electric motor 18. In this respect, it is noted that the generation of the operating noise is desirably prevented while the vehicle is stationary, that is, while the space within the vehicle is relatively quiet.

When the anti-lock braking operation is effected with the fluid pressure in the wheel brake cylinder 14 being higher than the threshold while the vehicle is running with an excessively large operating force of the brake pedal 10, on a road surface having a relatively high friction coefficient, the affirmative decision (YES) is obtained in both of steps S4 and S5, and the control flow goes to step S8 to determine that the braking system is in the noise-tolerable braking operation, and set the switching frequency to 500 kHz. During the anti-lock braking operation with the excessively large operating force of the brake pedal 10, the target output Pw of the electric motor 18 is relatively large, and the duty ratio of the switching element 40 is relatively high, resulting in a relatively large load acting on the electric motor 18. In this condition, therefore, it is desirable to minimize the amount of heat generated by the switching element 40 by lowering the switching frequency to 500 Hz. When the anti-lock braking operation is effected during running of the vehicle with a relatively small operating force of the brake pedal 10, on a snow-covered or other road surface having a relatively low friction coefficient, a negative decision (NO) is obtained in step S5, and the control flow goes to step S7 to determine that the braking system is in the normal braking operation, and select the relatively high switching frequency $f_H$=20 kHz. In this condition wherein the fluid pressure in the wheel brake cylinder 14 is relatively low, the target output Pw of the electric motor 18 is relatively small, and the amount of heat generated by the switching element 50 is relatively small.

Step S6, which is implemented when the anti-lock braking operation is not effected, is provided to determine whether the abrupt braking operation is effected. An affirmative decision (YES) is obtained in step S6 if one of the two conditions indicated above is satisfied, that is, if the target fluid pressure in the wheel brake cylinder 14 is higher than the predetermined threshold, and/or if the difference between the target and actual fluid pressure values of the wheel brake cylinder 14 is larger than the predetermined threshold. When the affirmative decision (YES) is obtained in step S6, the control flow goes to step S8 to determine that the braking system is in the noise-tolerable braking operation, and select the relatively low switching frequency $f_L$=500 Hz. If none of the two conditions indicated above is not satisfied, a negative decision (NO) is obtained in step S6, and the control flow goes to step S7 to select the relatively high switching frequency $f_H$=20 kHz.

When the abrupt braking operation is effected, the vehicle operator is usually more or less strained, and is less likely to be sensitive to the operating noise generated by the electric motor 18 at the relatively low switching frequency $f_L$. That is, the operating noise of the braking system is relatively tolerable during the abrupt braking operation. Although the load acting on the electric motor 18 is relatively large during the abrupt braking operation, the amount of heat generated by the switching element 40 is minimized by selecting the relatively low switching frequency $f_L$ of 500 Hz.

When the brake pedal 10 is not in operation, that is, when a negative decision (NO) Is obtained in step S2, the control flow goes to step S9 to determine whether the braking system is in the traction control braking operation. If an affirmative decision (YES) is obtained in step S9, the control flow goes to step S8 to determine that the braking system is in the noise-tolerable braking operation, and selects the relatively low switching frequency 500 Hz. During the traction control braking operation, the vehicle drive power source (e.g., engine) generally generates a relatively large operating noise, so that the operating noise of the braking system is relatively tolerable and need not be reduced.

Steps S7 and S8 are followed by step S10 in which the data indicative of the switching frequency $f_H$, $f_L$ of the switching element 40 which has been determined by the controller 32 are fed to the inverter 34, and the electric current applied to the electric motor 18 is controlled by the switching operation of the switching element 40 at the determined switching frequency. The electric motor 18 is not supplied with an electric current when the braking system is not in operation, that is, when the brake pedal 10 is placed in the non-operated position and when the traction control braking operation is not effected, namely, when a negative decision (NO) is obtained in step S9.

As described above, the motor control device 30 of the present braking system is arranged to control the switching element 40 to operate at the relatively high switching frequency $f_H$ of 20 kHz higher than the upper audibility limit when the braking system is in the normal braking operation (which includes an anti-lock braking operation on a road surface having a relatively low friction coefficient). In the normal braking operation, therefore, the operating noise of the electric motor 18 is not generated, so that the space within the vehicle is kept in a quiet condition. In the normal braking operation, the target or desired output of the electric motor 18 is relatively small, and the load acting on the electric motor 18 is relatively small, so that the switching operation of the switching element 40 at the relatively high switching frequency (20 kHz) will not cause a problem of heat generation.

In the abrupt braking operation or the anti-lock braking operation on a road surface having a relatively low friction coefficient, that is, in the noise-tolerable braking operation, the relatively low switching frequency $f_L$ of 500 Hz is selected to restrict the amount of heat generated by the switching element 40, since the target output and the load of the electric motor 18 are relatively large with a relatively high duty ratio of the switching element 40. Although the target output of the electric motor 18 is not so large in the traction control braking operation, the relatively low switching frequency $f_L$ is selected to minimize the amount of heat generated by the switching element 40, for thereby maximizing the expected service life of the switching element.

In the braking operation while the vehicle is stationary, the braking system is considered to be placed in the normal braking operation, so that the switching frequency of the switching element 40 is held at the relatively high level $f_H$, even when the operating force acting on the brake pedal 10 is increased with a result of an increase in the target output of the electric motor 18. Thus, the prevention of generation of the operating noise of the electric motor 18 is predominant over the prevention of generation of heat by the switching element 40.

Thus, the braking system according to the present embodiment of the invention is arranged to minimize the amount of heat generated by the switching element 40 so as to maximize the service life of the braking system, while minimizing the operating noise. It will be understood that a portion of the motor control device 30 assigned to implement steps S6 and S8 serves as an abrupt-braking-operation frequency lowering device for lowering the switching frequency f of the switching element 40 during the abrupt braking operation of the braking system. It will also be understood that a portion of the control device 30 assigned to implement steps S4, S5, S8 and S9 serves as a slip-control-operation frequency lowering device for lowering the switching frequency f of the switching element 40 during a slip control braking operation of the braking system such as the anti-lock braking operation with the relatively high fluid pressure in the wheel brake cylinder 14, or the traction control braking operation.

In the present embodiment, the anti-lock braking operation with a relatively small braking force is classified as the normal braking operation. However, any anti-lock braking operation may be classified as the noise-tolerable braking operation. Further, the traction control braking operation may be classified as the normal braking operation, since the load acting on the electric motor 18 is not so large during the traction control braking operation. The switching frequency f of the switching element 40 may be lowered when the amount of electric current actually flow through the electric motor 18 exceeds a predetermined upper limit, or when the rotating speed of the electric motor 18 exceeds a predetermined upper limit. Such arrangements make it possible to restrict the amount of heat generated by the switching element 40 to prolong its expected service life, when the load of the electric motor 18 is relatively large.

Although step S4 to determine whether the anti-lock braking operation is effected is followed by step S6 to determine whether the abrupt braking operation is effected, step S6 may be followed by step S4. The determination in step S6 as to whether the abrupt braking operation is effected may be based on appropriate operating conditions of the braking system other than the two conditions (a) and (b) described above. For instance, the determination in step S6 may be made by determining whether the rate of operation of the brake pedal 10, the rate of increase of the operating force of the brake pedal 10, or the rate of increase in the fluid pressure in the wheel brake cylinder 14 is higher than a predetermined upper limit. The determination in step S2 as to whether the brake pedal 10 has been operated may be based on an output signal of a brake switch provided to detect an operation of the brake pedal 10. Further, the determination in step S3 as to whether the vehicle is stationary may be based on an output signal of a vehicle speed sensor, which represents the actual vehicle running speed rather than the estimated vehicle running speed. The hydraulic pump 16 may be replaced by a hydraulic pump used to supply a high-pressure working fluid to a hydraulic pressure booster, or by a hydraulic pump 80 shown in FIG. 4.

Figure 4:
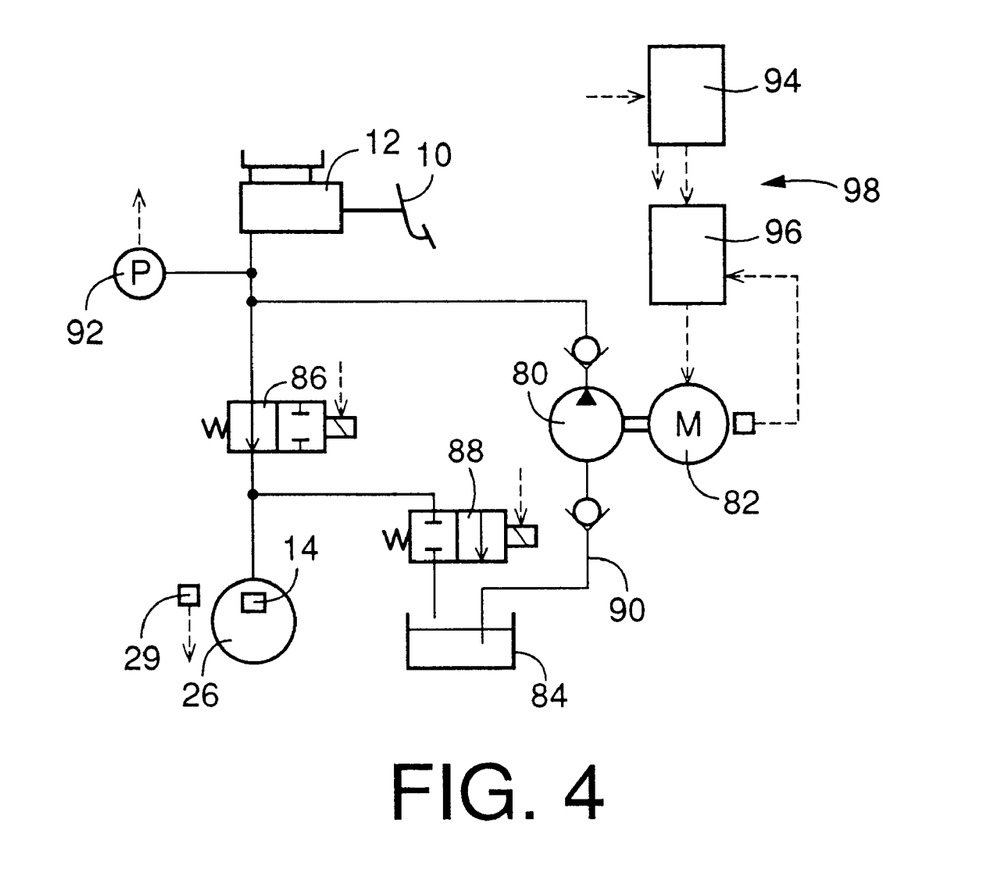
FIG. 4 is a diagram showing a hydraulically operated braking system according to another embodiment of the present invention.

Like the braking system according to the first embodiment described above, a hydraulically operated braking system according to a second embodiment of FIG. 4 includes the brake pedal 10, master cylinder 12 and wheel brake cylinder 14 which have been described, and the above-indicated hydraulic pump 80 and an electric motor 82. A solenoid-operated shut-off valve 86 is provided between the master cylinder 12 and the wheel brake cylinder 14, while a solenoid-operated shut-off valve 88 is provided between the wheel brake cylinder 14 and a reservoir 84. The fluid pressure in the wheel brake cylinder 14 is controlled by the solenoid-operated shut-off valves 86, 88. The anti-lock braking operation is effected while the wheel brake cylinder 14 is in communication with the master cylinder 12. The hydraulic pump 80 is provided in a pump passage 90 connected to the reservoir 84, and the fluid pressurized by the hydraulic pump 80 is returned to the master cylinder 12. The fluid pressure in the master cylinder 12 is detected by a master cylinder pressure sensor 92.

The electric motor 82 for operating the hydraulic pump 80 is controlled by a motor control device 98 including a controller 94 and an inverter 96. In the present embodiment, the hydraulic pump 80 is held in operation during the anti-lock braking operation, and is held off during the normal braking operation. During the anti-lock braking operation while the fluid pressure in the master cylinder 12 is higher than a predetermined threshold, the switching frequency of the switching element 40 is lowered to 500 Hz. In this respect, it is noted that the load acting on the electric motor 80 is relatively large when the fluid pressure in the master cylinder 12 is relatively high. During the anti-lock braking operation while the fluid pressure in the master cylinder 12 is not higher than the threshold, the switching frequency is held at 20 kHz to restrict the amount of heat generated by the switching element 40, for thereby prolonging the expected service life of the switching element.

The electric motor 18, 82 used to operate the hydraulic pump 17, 80 may be either a DC motor or an AC motor. The arrangement of the inverter 34, 96 depends upon whether the electric motor is a DC motor or an AC motor. The inverter 34, 96 may use a plurality of switching elements.

While the presently preferred embodiments of the present invention have been described above for illustrative purpose only, it is to be understood that the invention is not limited to the details of the illustrated embodiments, and that the invention may be embodied with various changes, modifications and improvements such as those described and numbered in the SUMMARY OF THE INVENTION.

What is claimed is:

1. A hydraulically operated braking system for a vehicle having a wheel, including a wheel brake cylinder for braking said wheel, and a hydraulic pump operated by an electric motor to operate said wheel brake cylinder, comprising:

motor control device which is connected to said electric motor and controls an electric current to be applied to said electric motor, by pulse width modulation, such that a PWM frequency at which the electric current is controlled by the pulse width modulation is set at a relatively high value higher than an upper audibility limit while the braking system is placed in a normal braking operation during which the generation of an operating noise of the braking system is not allowed, and at a relatively low value not higher than the upper audibility limit while the braking system is placed in one of (a) a slip control braking operation in which the pressure of the pressurized working fluid from said hydraulic pump to said wheel brake cylinder is controlled so as to hold a degree of slipping of said wheel within a predetermined range, (b) a vehicle stability control braking operation for improving a running stability of the vehicle, and (c) an abrupt braking operation, the generation of said operating noise being allowed in said slip control braking operation, said vehicle stability control braking operation and said abrupt braking operation.

2. A hydraulically operated braking system according to claim 1, wherein said motor control device includes a switching element which is alternately turned on and off at a controlled switching frequency as said PWM frequency.

3. A hydraulically operated braking system according to claim 1, wherein said motor control device includes an abrupt-braking-operation frequency lowering device which lowers said PWM frequency to said relatively low value when the braking system is placed in an abrupt braking operation.

4. A hydraulically operated braking system according to claim 3, wherein said abrupt-braking-operation frequency lowering device includes determining means for determining that the braking system is placed in said abrupt braking operation when a desired value of an output of said electric motor is larger than a predetermined threshold.

5. A hydraulically operated braking system according to claim 4, wherein said determining means determines that the braking system is placed in said abrupt braking operation when a desired value of a pressure of a working fluid pressurized by said hydraulic pump is higher than a predetermined threshold.

6. A hydraulically operated braking system according to claim 4, wherein said determining means determines that the braking system is placed in said abrupt braking operation when a difference between a desired value and an actual value of a pressure of a working fluid pressurized by said hydraulic pump is larger than a predetermined threshold.

7. A hydraulically operated braking system according to claim 4, wherein said determining means determines that the braking system is placed in said abrupt braking operation when a desired rate of increase of a pressure of a working fluid pressurized by said hydraulic pump is higher than a predetermined threshold.

8. A hydraulically operated braking system according to claim 4, further comprising a wheel brake cylinder to which a working fluid pressurized by said hydraulic pump is supplied to brake a wheel of a vehicle, and wherein said determining means determines that the braking system is placed in said abrupt braking operation when a desired value of a pressure of said working fluid in said wheel brake cylinder is higher than a predetermined threshold.

9. A hydraulically operated braking system according to claim 3, further comprising a wheel brake cylinder to which a working fluid pressurized by said hydraulic pump is supplied to brake a wheel of a vehicle, and wherein said abrupt-braking-operation frequency lowering device includes determining means for determining that the braking system is placed in said abrupt braking operation when a desired value of a pressure of said working fluid in said wheel brake cylinder is higher than a predetermined threshold, and/or when a desired rate of increase of the pressure of the working fluid in said wheel brake cylinder is higher than a predetermined threshold.

10. A hydraulically operated braking system according to claim 9, further comprising a brake operating member, and wherein said determining means determines said desired value of the pressure of the working fluid in said wheel brake cylinder, on the basis of an operating force which acts on said brake operating member.

11. A hydraulically operated braking system according to claim 9, further comprising a brake operating member, and wherein said determining means determines said rate of increase of the pressure of the working fluid in said wheel brake cylinder, on the basis of a rate of increase of an operating force which acts on said brake operating member.

12. A hydraulically operated braking system according to claim 9, wherein said determining means determines said rate of increase of the pressure of the working fluid in said wheel brake cylinder, on the basis of a difference between a desired value and an actual value of the pressure of the working fluid in said wheel brake cylinder.

13. A hydraulically operated braking system according to claim 1, wherein said motor control device includes a slip-control-operation frequency lowering device which lowers said PWM frequency to said relatively low value when the braking system is placed in a slip control braking operation.

14. A hydraulic operated braking system according to claim 13, further comprising a brake operating member and a wheel brake cylinder to which a working fluid pressurized by said hydraulic pump is supplied to brake a wheel of a vehicle, and wherein said slip-control-operation frequency lowering device includes determining means for determining that the braking system is placed said slip control braking operation when the braking system is placed in an anti-lock braking control operation in which the pressure of the working fluid supplied from said hydraulic pump to said wheel brake cylinder during an operation of said brake operating member is controlled such that a degree of slipping of said wheel is held within a predetermined range.

15. A hydraulic operated braking system according to claim 13, further comprising a brake operating member and a wheel brake cylinder to which a working fluid pressurized by said hydraulic pump is supplied to brake a drive wheel of a vehicle, and wherein said slip-control-operation frequency lowering device includes determining means for determining that the braking system is placed in said slip control braking operation when the braking system is placed in a traction control braking operation in which the pressure of the working fluid supplied from said hydraulic pump to said wheel brake cylinder without an operation of said brake operating member is controlled such that a degree of slipping of said drive wheel is held within a predetermined range.

16. A hydraulically operated braking system according to claim 1, includes slip-control-operation frequency lowering device for lowering said PWM frequency when the braking system is placed in a slip control braking operation and when a load acting on said electric motor is larger than a predetermined threshold.

17. A hydraulically operated braking system according to claim 16, further comprising a brake operating member and a wheel brake cylinder to which a working fluid pressurized by said hydraulic pump is supplied to brake a wheel of a vehicle, and wherein said slip-control-operation frequency lowering device includes determining means for determining that the braking system is placed in said slip control braking operation when the braking system is placed in an anti-lock braking operation in which the pressure of the working fluid supplied from said hydraulic pump to said wheel brake cylinder during an operation of said brake operating member is controlled such that a degree of slipping of said wheel is held within a predetermined range, said determining means determining that said load acting on said electric motor is larger than said predetermined threshold when the pressure of the working fluid in said wheel brake cylinder is higher than a predetermined threshold.

18. A hydraulically operated braking system according to claim 1, further comprising a brake operating member, and wherein said motor control device determines whether the braking system is placed in an abrupt braking operation on the basis of an operating state of said brake operating member.

19. A hydraulically operated braking system comprising:
a manually operable brake operating member;
a hydraulic pump;
an electric motor operable to drive said hydraulic pump; and
a motor control device connected to said electric motor, said motor control device being operable to control an electric current to be applied to said electric motor, by pulse width modulation, such that a PWM frequency at which the electric current is controlled by the pulse width modulation is higher than an upper audibility limit while said manually operable brake operating member is operated normally, and such that said PWM frequency is not higher than said upper audibility limit while said manually operable brake operating member is not operated normally.

20. A hydraulically operated braking system according to claim 19, wherein said motor control device controls said electric current such that said PWM frequency is not higher than said upper audibility limit while said manually operable brake operating member is operated abruptly to effect an abrupt braking operation.

21. A hydraulically operated braking system for a vehicle having a wheel, comprising:
a wheel brake cylinder operable to brake said wheel;
a hydraulic pump;
an electric motor operable to drive said hydraulic pump for supplying a pressurized working fluid to said wheel brake cylinder to operate said wheel brake cylinder; and
a motor control device connected to said electric motor, said motor control device being operable to control an electric current to be applied to said electric motor, by pulse width modulation, such that a PWM frequency at which the electric current is controlled by the pulse width modulation is higher than an upper audibility limit while the braking system is not placed in a slip control braking operation in which the pressure of the pressurized working fluid supplied from said hydraulic pump to said wheel brake cylinder is controlled so as to hold a degree of slipping of said wheel within a predetermined range, and such that said PWM frequency is not higher than said upper audibility limit while the braking system is placed in said slip control braking operation.

22. A hydraulically operated braking system according to claim 21, further comprising a manually operable brake operating member, and wherein said motor control device includes determining means for determining that the braking system is placed in said slip control braking operation when the braking system is placed in one of (a) an anti-lock braking control operation in which the pressure of the pressurized working fluid supplied from said hydraulic pump to said wheel brake cylinder during an operation of said manually operable brake operating member is controlled so as to hold said degree of slipping of said wheel within said predetermined range, and (b) a traction control braking operation in which the pressure of said pressurized working fluid supplied from said hydraulic pump to said wheel brake cylinder without an operation of said manually operable brake operating member is controlled so as to hold said degree of slipping of said wheel within said predetermined range.

* * * * *